United States Patent [19]
Ohnishi et al.

[11] Patent Number: 5,855,960
[45] Date of Patent: Jan. 5, 1999

[54] TOPCOATING COMPOSITION AND FILM-FORMING PROCESS BY USE OF THE SAME

[75] Inventors: Kazuhiko Ohnishi; Hirokazu Terashima; Osamu Isozaki, all of Hiratsuka, Japan

[73] Assignee: Kansai Paint Co., Ltd., Hyogo-ken, Japan

[21] Appl. No.: 769,848

[22] Filed: Dec. 19, 1996

Related U.S. Application Data

[62] Division of Ser. No. 548,698, Oct. 26, 1995, Pat. No. 5,635,572, which is a continuation of Ser. No. 235,347, Apr. 29, 1994, abandoned, which is a continuation-in-part of PCT/JP93/01360, Sep. 22, 1993.

[30] Foreign Application Priority Data

| Sep. 24, 1992 | [JP] | Japan | 4-279367 |
| Jun. 21, 1993 | [JP] | Japan | 5-174885 |
| Jul. 27, 1993 | [JP] | Japan | 5-204560 |
| Jul. 30, 1993 | [JP] | Japan | 5-209933 |
| Jul. 30, 1993 | [JP] | Japan | 5-209934 |
| Sep. 1, 1993  | [JP] | Japan | 5-241937 |

[51] Int. Cl.⁶ ..................... B05D 3/10
[52] U.S. Cl. ................. 427/337; 427/340; 427/341; 427/387; 525/453; 525/474; 525/934; 106/287.16; 428/423.1; 428/446
[58] Field of Search ..................... 525/453, 474, 525/934; 106/287.16; 428/423.1, 446; 427/337, 340, 341, 387

[56] References Cited

U.S. PATENT DOCUMENTS

| 4,271,021 | 6/1981  | Hauck ................................ 210/198.3 |
| 4,421,789 | 12/1983 | Kaneko et al. ........................ 427/204 |
| 4,622,369 | 11/1986 | Chang et al. ......................... 525/440 |
| 4,765,729 | 8/1988  | Taniguchi ............................. 351/163 |
| 5,211,989 | 5/1993  | Clinnin et al. ...................... 427/388.4 |
| 5,314,731 | 5/1994  | Yoneda et al. ........................ 428/429 |

FOREIGN PATENT DOCUMENTS

| 221282 | 10/1986 | Japan . |
| 160879 | 6/1990  | Japan . |

*Primary Examiner*—Margaret W. Glass
*Attorney, Agent, or Firm*—Fisher, Christen & Sabol

[57] ABSTRACT

The present invention relates a topcoating composition and a film-forming process by use of the topcoating composition, which are capable of forming a coated film having good weather resistance and good stain resistance. The present invention provides a topcoating composition prepared by incorporating a specified organosilicate and/or its condensate into a specified organic coating composition, a film formed from said topcoating composition being such that a surface of the film, which has been subjected to an acid treatment, shows a contact angle to water of 70° or less; and a film-forming process which comprises coating said topcoating composition onto a substrate to form a film, followed by treating the surface of the film with an acid.

25 Claims, No Drawings

TOPCOATING COMPOSITION AND FILM-FORMING PROCESS BY USE OF THE SAME

This is a divisional application of Ser. No. 08/548,698, filed on Oct. 26, 1995, now U.S. Pat. No. 5,635,572 which is a continuation application of Ser. No. 08/235,347, filed Apr. 29, 1994 (now abandoned), which is a continuation-in-part of PCT/JP93/01360, filed Sep. 22, 1993.

FIELD OF THE INVENTION

The present invention relates a topcoating composition and a film-forming process by use of the topcoating composition, which are capable of forming a coated film having good weather resistance and good stain resistance.

BACKGROUND OF THE INVENTION

An outdoor coating composition having good weather resistance has conventionally been applied onto outdoor substrates such as building structures, displays, guard fences, instruments, machines and the like for the purpose of decoration or protection.

The outdoor coating composition used at present may include, for example, polyurethane resin based coating composition, fluorocarbon resin based coating composition and the like, but use of these coating compositions results in such disadvantages that a surface of a coated product may easily be stained and show poor appearance by influence due to dust, iron powder, rain, particularly acid rain, sunlight, etc. during outdoor exposure.

Besides the above coating compositions, a silicone resin based coating composition containing an alkoxysilane group-containing polymer as a resin component has been used as a highly weather-resistant coating composition. When a period of outdoor exposure is as long as six months or so, stain on the surface of a film formed from the above coating composition may be reduced, but the use of the above coating composition shows such a problem that the surface of the film formed therefrom may easily be stained when the period of outdoor exposure is shorter than six months.

As an example of a method of preventing stain on the film surface, Japanese Patent Application Laid-Open No. 221282/86 discloses a process which comprises coating an alkylsilicate solution in an organic solvent onto the surface of a molded product and a process which comprises incorporating alkylsilicate into a molded product of a thermoplastic resin. However, the above methods had such drawbacks that the film provided by the above methods shows poor properties in retension of stain resistance and durability.

The present inventors made intensive studies for the purpose of solving the above problems to find out that a coating composition obtained by incorporating an organosilicate and a condensate thereof into an organic coating composition provides a film hardly stained or showing good stain resistance, resulting in accomplishing the present invention.

DISCLOSURE OF THE INVENTION

That is, the present invention relates to a topcoating composition prepared by incorporating an organosilicate represented by the general formula:

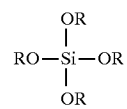

where R is same or different and is hydrogen atom or a monovalent hydrocarbon group having 1 to 10 carbon atoms, and/or its condensate into an organic coating composition, a film formed from said topcoating composition being such that a surface of the film, which has been subjected to an acid treatment, shows a contact angle to water of 70° or less; and a film-forming process which comprises coating said topcoating composition onto a substrate to form a film, followed by treating the surface of the film with an acid.

PREFERRED EMBODIMENTS FOR THE PRACTICE OF THE INVENTION

The organic coating composition used in the topcoating composition of the present invention may include a solvent-based organic coating composition, water-based organic coating composition, liquid organic coating composition free of solvent and water, powder coating composition, etc.

The solvent based organic coating composition may include a reactively curable coating composition containing a reactively curable organic resin as a resin component.

The reactively curable coating composition may include one prepared by dissolving or dispersing a curable resin composition, which is capable of being reactively cured by itself to form a crosslinked film structure, into an organic solvent.

The reactively curable coating composition used in the present invention may be such that the surface of a finally formed cured film, which has been subjected to a treatment with an aqueous sulfuric acid, has a contact angle to water of 70° or less.

The reactively curable coating composition is not particularly limited so long as the above conditions are satisfied, and may arbitrarily be selected from conventionally used ones. Of these, a coating composition containing a hydroxyl group-containing resin as a base resin is preferred, because the coating composition is capable of forming a film showing good stain resistance during a long period of outdoor exposure time.

The hydroxyl group-containing resin may specifically include resins such as fluorocarbon resin, acrylic resin, polyester resin, alkyd resin, silicone resin and the like, and modified resins such as polyester modified acrylic resin and the like. Of these, fluorocarbon resin and acrylic resin are preferred, because the film obtained by use of these resins shows good stain resistance.

The hydroxyl group-containing fluorocarbon resin may include ones obtained by copolymerizing a hydroxyl group-containing radically polymerizable unsaturated monomer (a), a fluoroolefin(b) and, if needed, other radically polymerizable unsaturated monomer(c).

The hydroxyl group-containing radically polymerizable unsaturated monomer(a) may include ones having a radically polymerizable unsaturated double bond radically copolymerizable with fluoroolefin and hydroxyl group, and specifically may include, for example, hydroxyalkyl vinyl ether such as hydroxylethyl vinyl ether, hydroxypropyl vinyl ether, hydroxybutyl vinyl ether, hydroxypentyl vinyl ether and the like; and hydroxyallyl ether such as ethylene glycol monoallyl ether, diethylene glycol monoallyl ether, triethylene glycol monallyl ether and the like.

The fluoroolefin(b) used as above may include ones represented by the general formula:

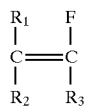

where $R_1$, $R_2$ and $R_3$ are H, F and Cl respectively, and may be same or different, and may specifically include, for example, vinyl fluoride, vinylidene fluoride, chloroethylene trifluorides, ethylene tetrafluorides and the like. Of these, ethylene tetrafluorides and chloroethylene trifluorides are preferred in that a film having good durability and good stain resistance is obtained.

The other radically polymerizable unsaturated monomer (c) may include ones having an unsaturated double bond radically copolymerizable with the above fluoroolefin, and may be selected from conventionally known monomers depending on film performances as required. Specific examples thereof may include α-olefins such as ethylene, propylene, isobutylene, butylene-1 and the like; vinyl ethers such as ethyl vinyl ehter, isobutyl vinyl ether, butyl vinyl ether, cyclohexyl vinyl ether and the like; aliphatic vinyl esters such as vinyl acetate, vinyl lactate, vinyl butylate, vinyl isobutylate, vinyl caproate, vinyl pivarate, vinyl caprate and the like; fatty acid isopropenyl esters such as isopropenyl acetate, isopropenyl propionate and the like; and the like.

The hydroxyl group-containing fluorocarbon resin may have carboxyl group. The above carboxyl group may be introduced, for example, by addition reaction of a part of hydroxyl groups in the hydroxyl group-containing fluorocarbon resin with a polybasic acid anhydride such as itaconic anhydride, succinic anhydride or the like.

In addition to the above, the hydroxyl group-containing fluorocarbon resin may include polymers obtained by copolymerizing a monomer(d) having perfluoroalkyl group or perfluoroalkenyl group at one end and ethylenical double bond at other end, a hydroxyl group-containing radically polymerizable unsaturated monomer(e), and other radically polymerizable unsaturated monomer(f).

Preferable examples of the monomer(d) having perfluoroalkyl group or perfluoroalkenyl group at one end and ethylenical double bond at other end may include perfluorobutylethyl methacrylate, perfluorooethylethyl methacrylate, perfluoroisononylethyl methacrylate, perfluorodecylethyl methacrylate and the like.

Preferable examples of the hydroxyl group-containing radically polymerizable unsaturated monomer(e) may include 2-hydroxyethyl acrylate, hydroxypropyl acrylate, 2-hydroxyethyl methacrylate, hydroxypropyl methacrylate and the like.

Preferable examples of the other radically polymerizable unsaturated monomer(f) may include $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and the like; ethylenically unsaturated carboxylic acids such as acrylic acid, methacrylic acid and the like; vinyl aromatic monomers such as styrene, α-methylstyrene, vinyl toluene and the like; amide compounds of acrylic acid or methacrylic acid and derivatives thereof; acrylonitrile, methacrylonitrile and the like. The hydroxy group-containing acrylic resin may include ones obtained by copolymerizing the above hydroxyl group-containing radically polymerizable unsaturated monomers (a) and/or (e), and $C_{1-18}$ alkyl ester of acrylic acid or methacrylic acid, or other radically polymerizable unsaturated monomer(g).

Examples of the other radically polymerizable unsaturated monomer(g) may include ethylenically unsaturated carboxylic acids such as acrylic acid, methacrylic acid and the like; vinyl aromatic monomers such as styrene, α-methylstyrene, vinyl toluene and the like; amide compounds of acrylic acid or methacrylic acid and derivatives thereof; acrylonitrile, methacrylonitrile and the like. The above hydroxy group-containing resin may have a number average molecular weight of about 2,000 to 100,000, preferably about 5,000 to 80,000. When the above molecular weight is less than about 2,000, both durability and retension of stain resistance are undesirably reduced. On the other hand, when more than 100,000, compatibility with the curing agent and alkyl silicate becomes poor and storage stability of the coating composition is undesirably reduced.

The hydroxyl group-containing resin may have a hydroxyl number of about 20 to 200, preferably about 50 to 150. When the hydroxyl number is less than about 20, the film shows undesirably poor water resistance and retension of stain resistance. On the other hand, when more than 200, the film shows undesirably poor durability, water resistance and stain resistance.

The hydroxyl group-containing resin may be used in combination with a reactive curing agent such as amino resin, polyisocyanate compound, blocked polyisocyanate compound and the like.

The amino resin may include a methyloled amino resin obtained by reaction of aldehyde with an amino component such as melamine, urea, benzoguanamine, acetoguanamine, steroguanamine, spiroguanamine, dicyandiamide and the like. Examples of aldehyde may include formaldehyde, paraformaldehyde, acetoaldehyde, benzaldehyde and the like. The methyloled amino resin may be etherified with a suitable alcohol to be used. Examples of the alcohol used in etherisification may include methyl alcohol, ethyl alcohol, n-propyl alcohol, i-propyl alcohol, n-butyl alcohol, i-butyl alcohol, 2-ethyl butanol, 2-ethyl hexanol and the like.

The polyisocyanate compound is a compound having two isocyanate groups in one molecule, and may include, for example, aliphatic compounds such as hexamethylene diisocyanate, trimethylhexamethylene diisocyanate and the like; alicyclic compounds such as hydrogenated xylylene diisocyanate, isophorone diisocyanate, cyclohexane diisocyanate and the like; aromatic compounds such as tolyrene diisocyanate, diphenylmethane diisocyanate and the like; and the like.

The blocked polyisocyanate compound may include ones obtained by blocking the above polyisocyanate compound with a lactam blocking agent such as ε-caprolactam, an alcohol blocking agent such as ethanol, propanol, butanol and the like, or an oxime blocking agent such as acetoxime.

A mixing ratio between the hydroxyl group-containing resin and the amino resin is such that the hydroxyl group-containing resin is in the range of 90 to 40% by weight, preferably 80 to 50% by weight, and the amino resin is in the range of 10 to 60% by weight, preferably 20 to 50% by weight based on a total weight of both thereof. When the mixing ratio is outside the above ranges, the film is undesirably reduced in stain resistance, water resistance, weather resistance, etc.

A mixing ratio between the hydroxyl group-containing resin and the (blocked) polyisocyanate compound is such that an isocyanate group in the (blocked) polyisocyanate compound is in the range of about 0.6 to 1.5 equivalents, preferably about 0.8 to 1.2 equivalents based on hydroxyl group in the hydroxyl group-containing resin. When the isocyanate group is less than about 0.6 equivalent, the film is undesirably reduced in weather resistance, stain resistance and water resistance. On the other hand, when the isocyanate group is more than about 1.5 equivalents, the film is undesirably reduced in stain resistance, weather resistance, etc.

In addition to the above-mentioned ones, the curable resin composition in the reactively curable coating composition used in the present invention may include ones obtained by incorporating a curing catalyst into a resin or resin mixture (hereinafter may be referred to as "a base resin") containing silanol group and/or hydrolyzable silyl group, hydroxyl group and epoxy group as the essential functional group component. The curable resin composition is capable of forming such a film that the base resin is combined with organosilicate or a condensate thereof, and provides such advantages as to show good stain resistance over a long period of time. The curable resin composition is explained in the following.

The hydrolyzable silyl group contained in the base resin used in the above coating composition is a residual group to form a hydroxysilane group by hydrolysis in the presence of water, and may include, for example, $C_{1-5}$ alkoxy group; aryloxy group such as phenoxy group, tolyloxy group, paramethoxyphenoxy group, paranitrophenoxy group, benzyloxy group and the like; acyloxy group such as acetoxy group, propyonyloxy group, butanoyloxy group, benzoyloxy group, phenylacetoxy group, formyloxy group and the like; residual groups represented by $-N(R_4)_2$, $-ON(R_4)_2$, $-ON=C(R_4)_2$ and $-NR_5COR_4$, wherein $R_4$ is same or different respectively and represents $C_{1-8}$ alkyl group, aryl group such as phenyl group and aralkyl group such as benzyl group, and $R_5$ represents $C_{1-8}$ alkyl group such as methyl, ethyl, propyl, butyl, pentyl, heptyl and the like; and the like.

The base resin may include, for example, ① a resin mixture (hereinafter may be referred to as "a resin①") containing a hydroxyl group-containing resin (A), an epoxy group-containing resin (B) and a resin (C) containing silanol group and/or hydrolyzable silyl group; ② a resin mixture (hereinafter may be referred to as "a resin ②") containing the epoxy group-containing resin (B) and the resin (C) containing silanol group and/or hydrolyzable silyl group, wherein either one or both of the resin (B) and the resin (C) may have hydroxyl group; ③ a resin (hereinafter may be referred to as "a resin ③") containing hydroxyl group, epoxy group, silanol group and/or hydrolyzable silyl group; and the like.

The resin ①:

The hydroxyl group-containing resin (A) may have two or more hydroxyl groups on an average in one molecule, and preferably may have a number average molecular weight of 1,000 to 100,000, preferably 3,000 to 80,000. When the number of hydroxyl group is less than two on an average, curing properties or gel fraction becomes undesirably poor. The number of hydroxyl group is preferably 400 or less on an average from the standpoints of stain resistance, water resistance, etc. When the number average molecular weight is less than 1,000, the film shows poor weather resistance, stain resistance, etc. On the other hand, when more than 100,000, compatibility with other components is reduced, resulting in non-uniform curing and poor stain resistance.

The hydroxyl group-containing resin (A) may include conventionally used resins, and preferably may include vinyl polymer from the standpoints of weather resistance and stain resistance.

The vinyl polymer may include a (co)polymer obtained by radically polymerizing, for example, a hydroxyl group-containing polymerizable unsaturated monomer (h) and, if needed, other polymerizable unsaturated monomer (i).

The hydroxyl group-containing polymerizable unsaturated monomer (h) may include, for example, the following (h-1) to (h-5).

The (h-1) may include hydroxyalkyl vinyl ether such as hydroxybutyl vinyl ether.

The (h-2) may include allyl alcohol and methallyl alcohol.

The (h-3) may include hydroxyalkyl ester of (meth)acrylic acid, for example, hydroxyethyl (meth)acrylate, hydroxypropyl meth(acrylate), hydroxybutyl (meth)acrylate, etc.

The (h-4) may include (poly)alkylene glycol monoacrylate such as ethylene glycol monoacrylate, polyethylene glycol monoacrylate and the like.

The (h-5) may include addition products of the (h-1) to (h-4) with lactones such as ε-caprolactone, γ-valerolactone and the like.

The other polymerizable unsaturated monomer (i) may include, for example, $C_{1-24}$ alkyl or cycloalkyl esters of (meth)acrylic acid such as methyl (meth)acrylate, ethyl (,meth)acrylate, butyl (meth)acrylate, hexyl (meth)acrylate, octyl (meth) acrylate, lauryl (meth)acrylate, cyclohexyl (meth) acrylate and the like; vinyl aromatic compounds such as styrene, vinyltoluene and the like; perfluoroalkyl (meth) acrylates such as perfluorobutylethyl (meth) acrylate, perfluoroisononylethyl (meth)acrylate, perfluorooctylethyl (meth)acrylate and the like; (meth)acrylonitriles, olefins, fluoroolefins, vinyl esters, cyclohexyl or alkyl vinyl ether olefins, vinyl esters, cyclohexyl or alkyl vinyl ethers, allyl ethers, and the like.

The epoxy group-containing resin (B) may have 2 to 300 epoxy groups on an average in one molecule, and preferably may have a number average molecular weight of 120 to 100,000, preferably 240 to 60,000. When the number of epoxy group is less than two on an average, weather resistance and stain resistance become indesirably poor. It is difficult to obtain a compound having a number average molecular weight less than 120. On the other hand, when the number average molecular weight is more than 100,000, compatibility with other components becomes poor, resulting in that the resulting film is undesirably reduced in weather resistance, stain resistance, etc.

The epoxy group-containing resin (B) may preferably include homopolymers of an epoxy group-containing polymerizable unsaturated monomer (j) such as alicyclic vinyl monomers represented by the general formulas (4) to (18) as disclosed in Japanese Patent Application Laid-Open No.160879/90, and copolymers of the monomer (j) with other polymerizable unsaturated monomer (i).

The resin (C) containing silanol group and/or hydrolyzable silyl group may preferably include homopolymers or copolymers with other polymerizable unsaturated monomer (i) of a silane monomer (k-1) having silanol group and/or hydrolyzable silyl group such as γ-(meth)acryloxypropyl trimethoxysilane, γ-(meth)acryloxypropyl triethyoxysilane, γ-(meth)acryloxypropyl trisilanol, γ-(meth) acryloxypropylmethyl dimethoxysilane, vinyltrimethoxysilane, vinyl triethoxysilane, 2-styrylethyl trimethoxysilane, allyltriethoxysilane, and the like; homopolymers or copolymers of a siloxane macromonomer (k-2), for example, a polysiloxane macromonomer disclosed in Japanese Patent Application Laid-Open No. 160879/90, having silanol group and/or hydrolyzable silyl group and a polymerizable unsaturated group and obtained by reacting the silane compound (k-1) with trialkoxy or trihydroxysilane compound such as methyltrimethoxysilane, phenyltrimethoxysilane and methyltrisilanol; diphenylsilane diol, and the like.

A mixting ratio of the resins (A), (B) and (C) is preferably such that the resin (A) is in the range of 5 to 95% by weight, preferably 20 to 80% by weight, the resin (B) is in the range of 95 to 5% by weight, preferably 80 to 20% by weight, and the resin (C) is in the range of 0.1 to 80% by weight, preferably 1 to 20% by weight based on a total weight of the resins (A), (B) and (C) from the standpoints of weather resistance, stain resistance, etc. respectively.

Resin ②:

The epoxy group-containing resin (B) and the resin (C) containing silanol group and/or hydrolyzable silyl group are the same as in the resin ①.

In the resin ②, either one or both of the resin (B) and the resin (C) may have hydroxyl group, and introduction of hydroxyl group into the resin (B) and the resin (C) may be carried out by using the hydroxyl group-containing polymerizable unsaturated monomer (h) as an essential monomer component. In this case, a number of hydroxyl group contained therein may preferably be one or more on an average, preferably 400 or less on an average. A number average molecular weight of the resin, into which hydroxyl group has been introduced, may desirably be 1,000 to 100,000, preferably 3,000 to 60,000 respectively.

A mixing ratio of the resins (B) and (C) may be such that the resin (B) is in the range of 5 to 95% by weight, preferably 20 to 80% by weight, and the resin (C) is in t he range of 95 to 5% by weight, preferably 80 to 20% by weight based on a total weight of the resins (B) and (C) from the standpoints of weather resistance, stain resistance, etc.

The resin ② may include, if needed, the hydroxyl group-containing resin (A).

Resin ③:

The resin ③ may preferably have one or more on an average, preferably 2 to 40 on an average of silanol group and/or hydrolyzable silyl group in one molecule, one or more on an average, preferably 2 to 40 of epoxy group in one molecule, and 2 to 200 on an average of hydroxyl group in one molecule from the standpoints of weather resistance, stain resistance, etc.

The resin ③ may preferably include, for example, a copolymer of the hydroxy group-containing polymerizable unsaturated monomer (h), the epoxy group-containing polymerizable unsaturated monomer (j), the silane compound (k-1) and/or the macromonomer (k-2) and, if needed, other polymerizable unsaturated monomer (i).

A mixing ratio of the monomers (h), (j), (k-1) and (k-2) may be such that respective functional groups in the resin are within the above ranges.

The resin ③ may desirably have a number average molecular weight of 1,000 to 100,000, preferably 3,000 to 60,000.

The resin ③ may include, if needed, the hydroxyl group-containing resin (A). Of the above resins ① to ③, the resin ③ is preferred from the standpoints of weather resistance and stain resistance.

The curing catalyst used in the above coating composition is used for promoting reactions of silanol group, hydrolyzable silyl group, epoxy group, and hydroxyl group in the base resin, and may preferably include metal alkoxides obtained by bonding alkoxy group to metals such as aluminium, titanium, zirconium, calcium, barium and the like; metal chelate compounds obtained by coordinating a chelate compound capable of constituting a keto-enol isomer with the above metal alkoxides; Lewis acids such as $AlCl_3$, Al $(C_2H_5)_2Cl$, $TiCl_4$, $ZrCl_4$, $SnCl_4$, $FeCl_3$, $BF_3$, $BF_3$: $(OC_2H_5)_2$ and the like; protonic acids including organic protonic acids such as methanesulfonic acid, benzenesulfonic acid, p-toluenesulfonic acid and the like, and inorganic protonic acids such as phosphoric acid, phosphorous acid, phosphinic acid, sulfuric acid and the like; compounds having Si-O-Al linkage such as aluminium silicate; and the like. Of these, the metal chelate compound is preferred, and may preferably include aluminium chelate compounds such as diisopropoxyethyl acetoacetate aluminium, tris (ethylacetoacetate) aluminium, isopropoxy.bis (ethylacetoacetate) aluminium, monoacetylacetonato.bis (ethylacetoacetate) aluminium, tris(n-proyl acetoacetate) aluminium, tris(n-butylacetoacetate) aluminium, monoethylacetoacetate.bis(acetylacetonato) aluminium, tris (accetylacetonato) aluminium, tris(propionylacetonato) aluminium, acetylacetonato.bis(propionylacetonato) aluminium and the like; titanium chelate compounds such as diisopropoxy.bis(ethylacetoacetate) titanium, diisopropoxy.bis(acetylacetonato) titanium and the like; zirconium chelate compounds such as tetrakis (n-propylacetoacetate) zireonium, tetrakis (acetylacetonato) zirconium, tetrakis (ethylacetoacetate) zirconium and the like; and the like.

A mixing amount of the curing catalyst is 0.01 to 30 parts by weight, preferably 0.1 to 10 parts by weight per 100 parts by weight of the base resin. When the amount of the curing catalyst is less than 0.01 part by weight, weather resistance and stain resistance are undesirably reduced. When more than 30 parts by weight, water resistance of the film is undesirably reduced.

The organic solvent used in the reactively curable coating composition may include conventionally used organic solvents which are substantially inactive to the curable resin composition and capable of dissolving or dispersing the curable resin composition. Specific examples of the organic solvent may include aromatic hydrocarbon solvents such as toluene, xylene and the like, ketones such as methyl ethyl ketone, methyl isobutyl ketone and the like, esters such as ethyl acetate, butyl acetate and the like, ethers such as dioxane, ethyleneglycol diethyl ether and the like, alcohols such as butanol, propanol and the like, aliphatic hydrocarbons such as pentane, hexane, heptane and the like, and the like.

A mixing ratio of the organic solvent is in the range of about 10 to 95% by weight, preferably about 20 to 90% by weight based on a total weight of the solvent and the curable resin composition.

In addition to the above reactively curable coating composition, the solvent based organic coating composition may include non-crosslinkable coating composition.

The non-crosslinkable coating composition is a solvent based or dispersible organic solvent based coating composition which is such that the solvent evaporates at room temperature or by heating to form a film.

The non-crosslinkable coating composition is such that after the resulting film has been treated with acid, the film surface shows a contact angle to water of 70° or less.

The non-crosslinkable coating composition is not particularly limited so long as the above conditions are satisfied, and may include conventionally used ones. Specific examples may include cellulose derivative coating composition such as nitrocellulose lacquer, acetyl cellulose lacquer, acetylbutyl cellulose lacquer, ethyl cellulose lacquer and the like, acrylic resin based coating composition, urethane resin based coating composition, vinyl chloride resin coating composition, fluorocarbon resin based coating composition, alkyd resin based coating composition, vinyl acetate resin based coating composition, styrene-butadiene resin based coating composition, vinyl chloride organosol coating composition and the like.

The organic solvent may arbitrarily be selected depending on a kind of the coating composition, and specifically includes, for example, hydrocarbons such as hexane, heptane and the like, alcohols such as propanol, butanol and the like, ethers such as ethyl cellosolve, butyl cellosolve, diethylene glycol monoethyl ether and the like, ketones such as acetone, methyl ethyl ketone, methyl isobutyl ketone and the like, esters such as ethyl acetate, propyl acetate, butyl acetate, cellosolve acetate and the like, and the like.

A content of the organic solvent is about 10 to 95% by weight, preferably about 20 to 90% by weight.

The water based coating composition may include conventionally used ones, for example, curable or non-curable ones, water-soluble, water dispersible or emulsifiable ones, and anionic, cationic or nonionic ones. Specifrically, the kind of the coating composition depending on the base resin may include, for example, alkyd resin based, polyester resin based, silicone resin based, fluorocarbon resin based, epoxy resin based, urethane resin based, acrylic resin based, vinyl chloride resin based, vinyl acetate resin based, polybutadiene resin based and their modified resins based coating compositions. The above curable coating composition may include, for example, amino-curable ones, (blocked) polyisocyanate-curable ones, oxidative polymerization-curable ones, actinic ray-curable ones, and the like.

The water based coating composition to be used is such that a film surface, which has been treated with acid, shows a contact angle to water of 70° or less.

The liquid coating composition free of the organic solvent or water may include cross linkable or non-crosslinkable, solution type or dispersion type, organic solvent-free liquid coating compositions, and may specifically include, for example, an actinic ray-curable coating composition, vinyl chloride plastisol coating composition and the like.

Formation of a film by use of the liquid coating composition may be carried out, for example, by irradiating the actinic ray such as ultraviolet light, electron beam and the Like in the case where the actinic ray-curable coating composition is used, or by heating in the case where the vinyl chloride plastisol coating composition is used.

The powder coating composition may include conventionally used heat-curable powder coating composition which contain powdered curable resin composition as a resin component and is capable of being reactively cured by itself to form a crosslinked film structure.

The powder coating composition is such that a surface of a finally formed cured film, which has been treated with acid, shows a contact angle to water of 70° or less.

The powdered curable resin composition may generally include ones obtained, for example, by incorporating a curing agent to react with a functional group in the powdered curable resin into the powdered curable resin having the functional group. Examples of the functional group in the powdered curable resin may include hydroxyl group, carboxyl group, epoxy group and the like Examples of the powdered curable resin may include acrylic resin, polyester resin, silicone resin, fluorocarbon resin and modified resins thereof such as silicone-modified acrylic resin.

Examples of the curing agent may include polycarboxylic acid such as azelaic acid, sebacic acid, dodecanoic diacid and the like, blocked polyisocyanate such as isophorone diisocyanate blocked with ε-caprolactam, polyepoxide such as triglycidyl isocyanurate, and the like.

Of these, the powdered curable resin composition may preferably include acrylic curable resin composition such as one containing, as the powdered curable resin, glycidyl group-containing acrylic resin containing glycidyl (meth) acrylate as a comonomer and polycarboxylic acid, dodecane diacid as a curing agent, and one containing, as the powdered curable resin, hydroxyl group-containing acrylic resin containing hydroxyethyl (meth)acrylate and blocked polyisocyanate as a curing agent; and polyester curable resin composition containing carboxyl group-containing polyester resin as the powdered curable resin and polyepoxide such as triglycidyl isocyanurate as a curing agent from such standpoints as to be improved in weather resistance and stain resistance and to be available at relatively lower cost composed with curable resin composition such as silicone based ones, fluorine based ones and the like.

The organosilicate used in the topcoating composition of the present invention includes ones represented by the general formula:

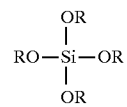

where R is same or different and is hydrogen atom or a monovalent hydrocarbon group having 1 to 10 carbon atoms and its condensates. Use of such an organosilicate as to have a carbon number more than 10 in R results in reducing a speed of hydrolysis and in making poor the stain resistance and durability of the film.

Examples of the monovalent hydrocarbon group having 1 to 10 carbon atoms in the above general formula may include alkyl group, aryl group and the like.

The above "alkyl group" may include straight-chain ones and branched ones, for example, methyl, ethyl, n-propyl, iso-propyl, n-butyl, iso-butyl, tert-butyl, n-pentyl, iso-pentyl, neopentyl, n-hexyl, iso-hexyl, n-octyl and the like. Of these, lower alkyl groups having 1 to 3 carbon atoms are preferred. The "aryl group" may include monocyclic and polycyclic ones, for example, phenyl group, toluyl group, xylyl group, naphtyl group and the like, phenyl group being preferred.

Preferable examples of the organosilicate used in the present invention may include tetrahydroxysilane, tetramethoxysilane, tetraethoxysilane, tetrapropoxysilane, tetrabutoxysilane, tetraphenoxysilane, dimethoxydiethoxysilane and the like. These may be used alone or in combination.

The condensate of organosilicate may include branched or straight-chain condensates between organosilicates represented by the above general formula and preferably includes condensater having a degree of condensation of 2 to 100 and represented by the general formual:

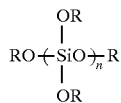

where R is defined as above, n is an integer of 2 to 100.

In the above general formula, when n is more than 100, effect of stain resistance is undesirably reduced.

The organosilicate used in the present invention may preferably include such ones that R in the general formula is a lower alkyl group having 1 to 3 carbon atoms, and the condensate thereof may particularly include such ones that R in the general formula is a lower alkyl group having 1 to 3 carbon atoms and that the degree of condensation is in the range of 2 to 10.

A mixing ratio of the organosilicate or the condensate thereof is in the range of about 0.1 to 50 parts by weight, preferably about 1 to 40 parts by weight per 100 parts by weight of a resin solid content in the above coating composition. When the amount of the organosilicate or the condensate thereof is less than about 0.1 part by weight, the film shows undesirably poor stain resistance. On the other hand, when more than about 50 parts by weight, the film may be hardened and may undesirably result defects such as cracking, reduction in gloss and the like.

In addition to the above, the topcoating composition of the present invention may include, if needed, colorants, fillers, flow modifiers, plasticizers, curing catalysts, ultraviolet light absorbents, resins other than the above such as trialkoxysilane, dialkoxysilane, monoalkoxysilane, lower condensates thereof and the like, and the like.

The topcoating composition of the present invention is such that the surface of the finally formed cured film is treated with acid, so that the resulting film surface may have a contact angle to water of 70° or less, preferably 20° to 65°. The contact angle is a value obtained by such a manner that a coated film immediately after curing is dipped and treated with a 25 wt % aqueous sulfuric acid solution at 20° C. for 24 hours, followed by washing an aqueous sulfuric acid solution adhered onto the film with water, drying, dropping a 0.03 cc deionized water drop onto the film surface, and by measuring a contact angle to water of the water drop 3 minutes after at 20° C. by use of a contact angle meter DCAA marketed by Kyowa Chemical Co., Ltd. When the contact angle is more than 70°, stain resistance and durability become poor.

According to the topcoating composition of the present invention, the above topcoating composition is coated onto a substrate, followed by forming a cured film at room temperature or by heating. When exposed outdoors, a contact angle to water of the film surface is slowly reduced due to an acid ingredient such as an acid rain, and the film surface is prevented from being stained.

According to the present invention, it is preferred that the film is treated with an acid beforehand prior to being exposed outdoors. The prior acid treatment results in making it possible to prevent stain of the film surface from the beginning.

The substate to coat the above topcoating composition may broadly include inorganic substrates such as glass, slate, concrete and the like; metal substrates, for example, metals such as aluminium, steel, tin, copper, stainless steel and the like, such metals as to be obtained by plating zinc, tin, chromium, etc. onto a surface of steel, and such metals as to treat a surface of steel, etc. with chromic acid, phosphoric acid, etc.; plastic substrates such as polyethylene, polyvinyl chloride, ABS and the like; tapes obtained by applying an adhesive or pressure-sensitive adhesive onto a substrate film such as polyvinyl chloride, polyethylene terephtharate, aluminium and the like; substrates obtained, if needed, by coating a known primer, intercoating composition and topcoating composition onto the above substrates, and the like.

The coating method of the topcoating composition may be carried out by coating the topcoating composition onto the surface of the substrate by means of, for example, brushing, spray coating, roller coating, dip coating, electrostatic powder coating, etc. A coating thickness may vary depending on the kind of the coating composition, coating means, etc., but generally in the range of about 1 to 500 $\mu$m, preferably about 10 to 100 $\mu$m. A drying conditions of the film may be selected depending on the kind of the topcoating composition. For example, in the case where a topcoating composition, which contains a metal chelate compound and a base resin containing hydrolyzable silyl group, hydroxyl group and epoxy group as the essential functional group components, is used, the drying conditions are at room temperature for about 24 hours or at about 140° C. for about 20 minutes when heated; in the case where a topcoating composition containing a hydroxyl group-containing resin as the base resin and a polyisocyanate compound as the crosslinking agent is used, the drying conditions are at room temperature for about 8 hours; in the case where a topcoating composition containing a hydroxyl group-containing resin as the base resin and a blocked polyisocyanate compound or amino resin as the crosslinking agent is used, the drying conditions are at about 140° C. for about 30 minutes; and in the case where a powder coating composition is used, the drying conditions are generally at about 140° C. to 300° C. for about 10 seconds to about 60 minutes.

The acid treatment of the film is carried out to such an extent that the film surface shows a contact angle to water of 70° or less, preferably 20 to 65° the method of the acid treatment may not particularly be limited so long as the above conditions are satisfied, but specifically the film may preferably be treated in an acidic aqueous solution having a pH of 6 or less at about 5° C. to 98° C. Examples of particularly preferable acids to be used may include inorganic acids such as sulfuric acid, hydrochloric acid, nitric acid, phosphoric acid and the like. Preferably, the acidic aqueous solution adhered onto the treated film is removed. The contact angle may be measured in the same manner as above described.

FUNCTION AND EFFECT OF THE INVENTION

The topcoating composition of the present invention provides remarkable effects on retension of stain resistance and durability compared with the method of coating an organic solvent solution of alkylsilicate onto the surface of the molded product, and the method of incorporating alkylsilicate into a thermoplastic resin as in the prior art. Reasons thereof are not clear, but are considered as follows.

The conventional film formed by the organic solvent solution of alkylsilicate may show defects such as crazing, cracking, shrinking and the like, because the alkylsilicate itself has poor film-forming properties, resulting in that when exposed outdoors the film may be peeled off the substrate due to the external factors such as rain, sun, heat, dust and the like to lose effect of stain resistance. It may also be possible to reduce defects such as crazing to a minimum by making a film thickness thinner, but it is difficult for this case to maintain the above effect for a long period of time, because the film is abraded by dust, etc. during exposure to outdoors.

Contrary thereto, it is guessed that since the topcoating composition of the present invention consists of the above components and the film therefrom has a contact angle to water of 70° or less, the film is such that a layer rich in the organosilicate or its condensate film component is formed in a film surface layer or in its neighborhood and a layer rich in an organic film is formed in the interior of the film, resulting in that the organosilicate or its condensate film component is reinforced by the organic film to improve retension of stain resistance and durability.

The method of incorporating alkylsilicate into thermoplastic resin has such disadvantages that then a large amount of alkylsilicate is incorporated, characteristics of the thermoplastic resin is lost and the film may show poor fabrication quality, etc., on the other hand, when an amount of the organosilicate to be incorporated is controlled to such an extent that the fabrication quality is maintained, it is impossible to obtain a film showing good stain resistance, without satisfying requirements of both fabrication quality and stain resistance.

Contrary thereto, the topcoating composition of the present invention is such that the film formed therefrom comprises the surface layer rich in organosilicate or its condensate and the interior layer rich in the organic film as above described, and requirements of stain resistance are satisfied by the presence of organosilicate or its condensate and requirements of durability, fabrication quality, adhesion properties, etc. are satisfied by the presence of the organic film, resulting in providing remarkable effects to satisfy requirements of both stain resistance and durability.

Moreover, the film formed according to the process of the present invention is such that the layer rich in organosilicate or its condensate is formed in the film surface layer or in its neighborhood, and the organosilicate or its condensate therein is condensated and is made high-molecular weight, resulting providing effects to show good properties in stain resistance and durability from the beginning.

INDUSTRIAL APPLICABILITY

The topcoating composition and film-forming process according to the present invention are useful for coating of outdoor substrates such as building structures, displays, guard fences, instruments, machines and the like.

EXAMPLE

The present invention will be explained more in detail by the following Examples, in which "part" and "%" are by weight basis.

Reactively Curable Organic Solvent Based Coating Composition
Reactively Curable Resin Composition ①

A reactively curable resin composition ① was prepared by incorporating one part of tris (acetylacetonato) aluminium into 200 parts of a resin having a resin solid content of 50% and a number average molecular weight of 40,000, and obtained by radically polymerizing in xylene a mixture of 100 parts of γ-methacryloxypropyl-trimethoxaysilane, 14.2 parts of glycidyl methacrylate, 12.0 parts of 2-hydroxyethyl methacrylate, 63.8 parts of n-butyl methacrylate and 2 parts of azobisisobutylvaleronitride.

Reactively Curable Resin Composition ②

A mixture of 5 parts of γ-methacryloxypropyltrimethoxysilane, 95 parts of methyltrimethoxysilane, 30 parts of deionized water and 98% formic acid was reacted at 100° C. for 8 hours to obtain a siloxane macromonomer having a number average molecular weight of 2,500.

Next, one part of tris (acetylacetonato) aluminium was incorporated into 200 parts of a resin havinga resin solid content of 50% and a number average molecular weight of 8,000, and obtained by radically polymerizing a mixture of 15 parts of the siloxane macromonomer, 20 parts of 3,4-epoxycyclohexyl methacrylate, 18 parts of 2-hydroxyethyl acrylate, 32 parts of n-butyl methacrylate, 15 parts of styrene and 4 parts of azobisisobutylonitrile in isobutyl acetate to obtain a reactively curable resin composition ②.

Reactively Curable Resin Composition ③
RETAN 1026 CLEAR (Trademark, merketed by Kansai Paint Co., Ltd., acrylpolyisocyanate-curable organic solvent based coating composition, resin solid content: 50%)

Reactively Curable Resin Composition ④
KANPE-FRON CW CLEAR (Trademark, marketed by Kansai Paint Co., Ltd., Fluoropolyisocyanate-curable organic solvent based coating composition, resin solid content: 50%)

Reactively Curable Resin Composition ⑤
KANPE-FRON 160 CLEAR (Trademark, marketed by Kansai Paint Co., Ltd., fluoro amino-curable organic solvent based coating composition, resin solid content: 50%)

Examples 1–14

Topcoating compositions of Examples 1–14 were obtained according to formulations based on solid content as listed in Table 1 respectively.

Comparative Examples 1–5

Comparative topcoating compositions of Comparative Examples 1–5 were obtained according to formulations as listed in Table 1 respectively.

Preparation of Coated Plate

KANPE CURE PRASAF #500 IVORY (Trademark of epoxy resin based undercoating composition, marketed by Kansai Paint Co., Ltd. was coated onto a 0.8 mm thick steel plate treated with zinc phesphate to be a dry film thickness of 20 μm, followed by drying, coating KANPE-FRON CW (Trademark of fluorine based white topcoating composition, marketed by Kansai Paint Co., Ltd.) to be a dry film thickness of 20 μm, and by drying to obtain a substrate.

Next, the surface of the substrate was slightly abraded, followed by coating thereonto topcoating compositions of Examples and comparative topcoating compositions of Comparative Examples to be a dry film thickness of 20 μm by use of the bar coater respectively, and by drying under the conditions shown in Table 1 to obtain coated plates respectively.

Results of film performance tests are shown in Table 1.

TABLE 1

|  | Examples | | | | | | | | | |
|---|---|---|---|---|---|---|---|---|---|---|
|  | 1 | 2 | 3 | 4 | 5 | 6 | 7 | 8 | 9 | 10 |
| Formulations | | | | | | | | | | |
| *Curable resin composition* | | | | | | | | | | |
| kind |  |  |  |  | ① |  |  |  |  | ② |
| amount |  |  |  |  | 100 |  |  |  |  |  |
| *organo silicates* | | | | | | | | | | |
| tetraphenyl silicate |  | 10 |  |  |  |  |  |  |  |  |
| tetraethyl silicate | 20 |  | 40 |  |  |  |  |  | 20 |  |
| tetraphenylethyl silicate |  |  |  | 10 |  |  |  |  |  |  |
| methyl silicate 51 (*1) |  |  |  |  | 10 |  |  |  |  |  |
| ethyl silicate 40 (*1) |  |  |  |  |  | 20 | 30 |  |  | 20 |
| ethyl silicate 48 (*3) |  |  |  |  |  |  |  | 20 |  |  |
| Drying conditions | 20° C. 24 hrs |  |  |  | 140° C. - 30 minutes | | | | | |
| Contact angle to water (*4) | 61° | 62° | 57° | 62° | 62° | 58° | 59° | 59° | 60° | 59° |
| Film appearance prior to outdoor exposure (*5) | ⊚ | ⊚ | ⊚ | ⊚ | ⊚ | ⊚ | ⊚ | ⊚ | ⊚ | ⊚ |
| *Outdoor exposure tests (*6)* | | | | | | | | | | |
| 3 months | | | | | | | | | | |
| gloss retention | 100 | 100 | 100 | 100 | 100 | 100 | 100 | 100 | 100 | 100 |
| color difference | 2.9 | 3.2 | 1.2 | 3.3 | 3.4 | 1.8 | 1.5 | 1.8 | 2.8 | 1.8 |
| appearance | ⊚ | ⊚ | ⊚ | ⊚ | ⊚ | ⊚ | ⊚ | ⊚ | ⊚ | ⊚ |
| 6 months | | | | | | | | | | |
| gloss retention | 100 | 99 | 100 | 100 | 99 | 100 | 100 | 100 | 100 | 100 |
| color difference | 2.4 | 3.0 | 1.1 | 3.1 | 3.3 | 1.5 | 1.3 | 1.3 | 2.3 | 1.4 |
| appearance | ⊚ | ⊚ | ⊚ | ⊚ | ⊚ | ⊚ | ⊚ | ⊚ | ⊚ | ⊚ |
| 12 months | | | | | | | | | | |
| gloss retention | 100 | 96 | 100 | 96 | 97 | 99 | 100 | 100 | 100 | 99 |
| color difference | 2.1 | 2.8 | 1.0 | 2.9 | 3.0 | 1.0 | 1.0 | 1.0 | 1.9 | 1.0 |
| appearance | ⊚ | ⊚ | ⊚ | ⊚ | ⊚ | ⊚ | ⊚ | ⊚ | ⊚ | ⊚ |
| Adhesion properties (*2) | ○ | ○ | ○ | ○ | ○ | ○ | ○ | ○ | ○ | ○ |
| Fabricating properties (*3) | 30 | 30 | 30 | 30 | 30 | 30 | 30 | 30 | 30 | 30 |

|  | Examples | | | | Comparative Examples | | | | | |
|---|---|---|---|---|---|---|---|---|---|---|
|  | 11 | 12 | 13 | 14 | 1 | 2 | 3 | 4 | 5 | 6 |
| Formulations | | | | | | | | | | |
| *Curable resin composition* | | | | | | | | | | |
| kind | ③ | ④ | ⑤ | ⑥ | ① | ② | ③ | ④ | ⑤ | tetra-ethyl silicate |
| amount |  | 100 |  |  |  |  |  |  |  |  |
| *organo silicates* | | | | | | | | | | |
| tetraphenyl silicate |  |  |  |  |  |  |  |  |  |  |
| tetraethyl silicate |  | 20 |  |  |  |  |  |  |  |  |
| methyl silicate 51 (*1) |  |  |  |  |  |  |  |  |  |  |
| ethyl silicate 40 (*1) |  |  |  |  |  |  |  |  |  |  |
| ethyl silicate 48 (*3) |  |  |  |  |  |  |  |  |  |  |
| Drying conditions | 140° C. - 30 minutes | | | | | | | | | 20° C. 24 hrs |
| Contact angle to water (*4) | 66° | 67° | 68° | 61° | 85° | 88° | 82° | 88° | 90° | ** |
| Film appearance prior to outdoor exposure (*5) | ⊚ | ⊚ | ⊚ | ⊚ | ⊚ | ⊚ | ⊚ | ⊚ | ⊚ | ○ |
| *Outdoor exposure tests (*6)* | | | | | | | | | | |
| 3 months | | | | | | | | | | |
| gloss retention | 100 | 100 | 100 | 100 | 100 | 100 | 100 | 100 | 100 | 100 |
| color difference | 6.0 | 6.9 | 6.9 | 2.5 | 7.0 | 7.0 | 7.0 | 8.0 | 8.1 |  |
| appearance | ○ | ○ | ○ | ⊚ | ⊚ | ⊚ | ⊚ | ⊚ | ⊚ | ○ |
| 6 months | | | | | | | | | | |
| gloss retention | 100 | 100 | 100 | 100 | 99 | 100 | 99 | 100 | 100 |  |
| color difference | 5.2 | 5.3 | 5.5 | 1.5 | 5.5 | 6.0 | 7.5 | 9.0 | 9.2 |  |
| appearance | ○ | ○ | ○ | ⊚ | ⊚ | ⊚ | ⊚ | ⊚ | ⊚ | X |

TABLE 1-continued

| 12 months | | | | | | | | | | |
|---|---|---|---|---|---|---|---|---|---|---|
| gloss retension | 95 | 95 | 100 | 100 | 96 | 98 | 90 | 100 | 100 | |
| color difference | 1.0 | 4.8 | 4.9 | 4.7 | 1.0 | 4.8 | 5.2 | 8.3 | 11.0 | 11.5 |
| appearance | ○ | ○ | ○ | ◎ | ◎ | ◎ | ◎ | ◎ | ◎ | X |
| Adhesion properties (*2) | ○ | ○ | ○ | ○ | ○ | ○ | ○ | ○ | ○ | — |
| Fabricating properties (*3) | 30 | 30 | 30 | 30 | 30 | 30 | 30 | 30 | 30 | — |

In Table 1, (*1) to (*3) means as follows repectively.

(*1) Methyl silicate 51, ethyl silicate 40 and ethyl silicate 48: Trademarks of lower condensates of tetraalkyl silicate, marketed by Colcote Co., Ltd.

(*2) Adhesion properties: A test was made according to the cross cut tape test defined in JIS K5400 8.5.2., by forming 100 (1×1 mm) squares, followed by adhering thereonto an adhesive cellophane tape, separating the tape, and by examining a number of remaining squares. Evaluation was made as follows: ○ shows that none of the squares was peeled off, Δ shows that some corners of the squares were peeled off, an x shows that one third of the squares were peeled off.

(*3) Fabricating properties: Tests were carried out by use of Du pont impact tester under the conditions of a radius from an impact center of ½ inch and a falling weight of 500 g. A maximum height developing no cracks on the film surface is shown.

(*4) Contact angle to water:

It shows a value obtained by such a measuring method that a film immediately after being formed is dipped into a 25 wt % aqueous sulfuric acid solution to be treated at 20° C. for 24 hours followed by washing the aqueous sulfuric acid solution adhered onto the film with water, drying, dropping a 0.03 cc water drop of deionized water onto the surface of the film, and measuring a contact angle of the water drop three minutes after at 20° C. by use of a Contactangle meter DCAA marketed by Kyowa Chemical Co., Ltd. In Table 1, ** shows that measurements were impossible due to elution.

(*5) Appearance: The surface of the film was examined by the naked eye to evaluate as follows.

◎: The film shows no defects such as crazing, flashing, flaking and the like.

○: The film shows a little development of crazing and flashing.

Δ: The film shows some development of crazing, flashing and flaking.

x: The film shows a remarkable development of crazing, flashing and flaking.

(*6) Gloss retension: Showing a value calculated and obtained by the following equation: (60° specular reflection percentage after outdoor exposure)/(60° specular reflection percentage prior to outdoor exposure)×100. Color difference: Showing a color difference between before and after exposure as $\Delta E_{ab}$ in accordance with JIS Z8730.

Appearance: Evaluated in the same manner as in (*5).

In Example 14, a film immediately after being formed was dipped into a 2.5 wt % aqueous sulfuric acid solution to be treated at 20° C. for 24 hours, followed by washing the aqueous sulfuric acid solution adhered onto the film surface with water, and by drying to be used for tests of outdoor exposure tests, adhesion properties and fabricating properties. In connection therewith, in Examples other than this Example and Comparative Examples, a film not treated as above was used.

Non-crosslinkable organic solvent based coating composition

FUCARON (white): Trade name of fluorocarbon resin based coating composition, resin solid content of 34%, marketed by Kansai Paint Co., Ltd.

ACRIC 2000 GL (white): Trade name of acrylic resin based coating composition, resin solid content of 30%, marketed by Kansai Paint Co., Ltd.

VINYBON 100 (white): Trade name of vinyl chloride resin based coating composition, resin solid content of 27%, marketed by Kansai Paint Co., Ltd.

MULTI-TILE OVER COAT AC (white): Trade name of vinyl acetate-acrylic resin basecd coating composition, resin solid content of 25%, marketed by Kansai Paint Co., Ltd.

KP COLOR 4009 (white): Trade name of vinyl chloride sol resin coating composition, resin solid content of 85%, marketed by Kansai Paint Co., Ltd.

Solvent-free coating composition

ZONNE OVER COAT W-2000 CLEAR: Trade name of urethane acrylate resin based ultraviolet light-curable coating composition, resin solid content of 100%, marketed by Kansai Paint Co., Ltd.

Examples 15–25

Non-crosslinkable or solvent-free coating compositions, organosilicates and their condensates were formulated as shown in Table 2 to obtain respective coating compositions of Examples 15–25. In Table 2, the formulation shows parts by weight of organosilicate and its condensate per 100 parts by weight of the resin solid content in the coating composition.

Comparative Examples 6–11

Non-crosslinkable or solvent-free coating compositions in Table 2 were used as comparative coating compositions respectively.

TABLE 2

|  | Examples | | | | | | | | | | | Comparative Examples | | | | | |
| --- | --- | --- | --- | --- | --- | --- | --- | --- | --- | --- | --- | --- | --- | --- | --- | --- | --- |
|  | 15 | 16 | 17 | 18 | 19 | 20 | 21 | 22 | 23 | 24 | 25 | 6 | 7 | 8 | 9 | 10 | 11 |
| Coating Compositions | | | | | | | | | | | | | | | | | |
| Non-cross-linkable | | | | | | | | | | | | | | | | | |
| FUCA RON (white) | 100 | 100 | 100 | 100 | 100 | 100 | | | | | | 100 | | | | | |
| ACRIC 2000 GL (white) | | | | | | | 100 | | | | | | 100 | | | | |
| VINYBON 100 (white) | | | | | | | | 100 | | | | | | 100 | | | |
| MULTIL-TILE OVER COAT AC (white) | | | | | | | | | 100 | | | | | | 100 | | |
| KP COLOR 4009 (white) solvent-free | | | | | | | | | | 100 | | | | | | 100 | |
| ZONNE OVER COAT SW-2000 CLEAR | | | | | | | | | | | 100 | | | | | | 100 |
| Organo-silicates and thier condensates | | | | | | | | | | | | | | | | | |
| tetraphenyl silicate | 20 | | | | | | | | 20 | | | | | | | | |
| tetraethyl silicate | | 10 | | | | | 20 | | | | | | | | | | |
| tetraphylethyl silicate | | | 20 | | | | | 20 | | | | | | | | | |
| methyl silicate 51* | | | | 20 | | | | | | | | | | | | | |
| ethyl licate 40* | | | | | 20 | | | | | 20 | | | | | | | |
| ethyl licate 48* | | | | | | 20 | | | | | 20 | | | | | | |

*Methyl silicate 51, ethyl silicates 40 and 48 are trademarks of lower iondensates of tetraalkyl silicate, marketed by Colcote Co., Ltd. (hereinafter referred to as such)

Film appearance and performances:
Results are shown in Table 3
Preparation of coated test plates:

Examples 15–24 and Comparative Examples 6–10

KANPE CURE PRASAF 500 IVORY (Trade name of epoxy resin based undercoat coating composition, marketed by Kansai Paint Co., Ltd.) was coated onto a zinc phosphate-treated steel plate (0.8 mm in thickness) to be a dry film thickness of 20 μm, followed by drying, coating thereonto coating compositions corresponding to Examples and Comparative Examples respectively, and by evaporating an organic solvent at room temperature or by heating to obtain coated test plates corresponding to Examples and Comparative Examples respectively.

Example 25 and Comparative Example 11

KANPE CURE PRASAF 500 IVORY (Trade name of epoxy resin based undercoat coating composition, marketed by Kansai Paint Co., Ltd.) was coated onto a zinc phosphate-treated steel plate (0.8 mm in thickness) to be a dry film thickness of 20 μm, followed by drying, coating thereonto RETAN 1026 WHITE (Trade name of acrylic polyisocyanate resin based coating composition, marketed by Kansai Paint Co., Ltd.) to be a dry film thickness of 20 μm, drying, coating thereonto coating compositions corresponding to Examples and Comparative Examples, and by irradiating ultraviolet light for curing, resulting in obtaining coated test plates corresponding to Examples and Comparative Examples.

In Table 3, (*4) to (*6) have the same meanings as above.

Treatment (*7) in Table 3: A resulting film was dipped into a 2.5 wt % aqueous sulfuric acid solution at 20° C. for 24 hours, followed by washing the aqueous sulfurin acid solution adhered onto the film with water, and by drying at room temperature to be referred to as "treated". On the other hand, a case where the above treatment was not carried out is referred to as "non-treated".

TABLE 3

|  | Examples | | | | | | | | |
| --- | --- | --- | --- | --- | --- | --- | --- | --- | --- |
|  | 15 | | 16 | 17 | 18 | 19 | 20 | 21 | 22 |
| Treatment (*7) | non-treated | treated | non-treated | non-treated | non-treated | non-treated | non-treated | non-treated | non-treated |
| Contact angle to water (*4) | 56 |  | 62 | 61 | 59 | 58 | 60 | 61 | 59 |
| Film appearance prior to outdoor exposure (*5) | ☉ | ☉ | ☉ | ☉ | ☉ | ☉ | ☉ | ☉ | ☉ |
| Outdoor exposure test (*6) | | | | | | | | | |
| 1 month | | | | | | | | | |
| gloss retention | 100 | 100 | | | | | | | |
| color difference | 5.8 | 2.8 | | | | | | | |
| appearance | ☉ | ☉ | | | | | | | |
| 3 months | | | | | | | | | |

TABLE 3-continued

| gloss retension | 100 | 100 | 100 | 99 | 100 | 99 | 100 | 100 | 100 |
|---|---|---|---|---|---|---|---|---|---|
| color difference | 3.5 | 2.7 | 2.9 | 3.1 | 3.2 | 3.5 | 3.8 | 3.2 | 3.4 |
| appearance | ⊚ | ⊚ | ⊚ | ⊚ | ⊚ | ⊚ | ⊚ | ⊚ | ⊚ |

| | Examples | | | Comparative Examples | | | | | |
|---|---|---|---|---|---|---|---|---|---|
| | 23 | 24 | 25 | 6 | 7 | 8 | 9 | 10 | 11 |
| Treatment (*7) | non-treated | non-treated | non-treated | non-treated | non-treated | non-treated | non-treated | non-treated | non-treated |
| Contact angle to water (*4) | 60 | 57 | 58 | 92 | 89 | 89 | 90 | 90 | 89 |
| Film appearance prior to outdoor exposure (*5) | ⊚ | ⊚ | ⊚ | ⊚ | ⊚ | ⊚ | ⊚ | ⊚ | ⊚ |
| Outdoor exposure test (*6) | | | | | | | | | |
| 1 month | | | | | | | | | |
| gloss retension | | | | | | | | | |
| color difference | | | | | | | | | |
| appearance | | | | | | | | | |
| 3 months | | | | | | | | | |
| gloss retension | 100 | 100 | 100 | 100 | 99 | 99 | 100 | 98 | 100 |
| color difference | 2.8 | 2.9 | 2.4 | 7.9 | 8.5 | 8.1 | 7.2 | 7.3 | 7.6 |
| appearance | ⊚ | ⊚ | ⊚ | ⊚ | ⊚ | ⊚ | ⊚ | ⊚ | ⊚ |

Water-based coating composition

VINY-DELUXE 300 (white): Trade name of acrylic resin emulsion coating composition, marketed by Kansai Paint Co., Ltd.

ASCA (white): Trade name of self-crosslinking acrylic resin water-based coating composition. ALES-GUMTEX (white): Trade name of acrylic rubber later, marketed by Kansai Paind Co., Ltd.

Acrylic melamine (white): A water dispersion of acrylic resin having a hydroxyl value of 100 and an acid value of 60, butylated melamine resin, resin solid content weight ratio between the former resin to the latter resin being 60 to 40, diethanolamine in a neutralization equivalent of 0.8 and titanium white in an amount of 80 parts by weight per 100 parts by weight of the resin.

Examples 26–34

Water-based coating compositions and organosilicates and their condensates as shown in Table 4 were formulated to obtain respective coating compositions of Examples 26–34. In Table 4, the above formulations are represented by parts by weight of organosilicates and their condensates per 100 parts by weight of the resin solid content in the water-based coating composition.

Comparative Examples 12–15

Water-based coating compositions shown in Table 4 were used as comparative coating compositions of Comparative Examples 12–15 respectively.

TABLE 4

| | | Examples | | | |
|---|---|---|---|---|---|
| | | 26 | 27 | 28 | 29 |
| Water-based coating compositions | VINY-DELUXE 300 (white) | 100 | 100 | 100 | 100 |
| | ASCA (white) | | | | |
| | ALES-GUMTEX (white) | | | | |
| | Acrylic melamine (white) | | | | |
| Organo- | tetraphenyl silicate | | | 20 | |

TABLE 4-continued

| silicates and their condensates | tetraethyl silicate | | | 10 | | | | | |
|---|---|---|---|---|---|---|---|---|---|
| | tetraphenylethyl silicate | | | | 20 | | | | |
| | methyl silicate 51 (*) | | | | | 20 | | | |
| | ethyl silicate 40 (*) | | | | | | | | |
| | ethyl silicate 48 (*) | | | | | | | | |

| | Examples | | | | | Comparative Examples | | | |
|---|---|---|---|---|---|---|---|---|---|
| | 30 | 31 | 32 | 33 | 34 | 12 | 13 | 14 | 15 |
| | 100 | 100 | | | | 100 | | | |
| | | | 100 | | | | 100 | | |
| | | | | 100 | | | | 100 | |
| | | | | | 100 | | | | 100 |
| | | | | | 20 | | | | |
| | | | | 20 | | | | | |
| | | | 20 | | | | | | |
| | 20 | | | | | | | | |
| | | 20 | | | | | | | |

Film appearance and performances:
Results are shown in Table 5.
Preparation of coated test plates:

Examples 26–34 and Comparative Examples 12–15

KANPE CURE PRASAF 500 IVORY (Trade name of epoxy resin based undercoat coating composition, marketed by Kansai Faint Co., Ltd.) was coated onto zinc phosphate-treated steel plate (0.8 mm in thickness) to be a dry film thickness of 20 μm, followed by drying, coating thereonto coating compositions corresponding to Examples and Comparative Examples respectively, and by drying at room temperature, i.e. 20° C. for 24 hours when VINY-DELUXE 300, ASCA and ALES-GUMTEX are used, or by heating and drying at 180° C. for 20 minutes when acrylic melamine is used to obtain coated test plates corresponding to Examples and Comparative Examples respectively.

In Table 5, (*4)–(*7) have the same meanings as above.

TABLE 5

| | Examples | | | | | |
|---|---|---|---|---|---|---|
| | 26 | 27 | 28 | 29 | 30 | 31 |
| Treatment (*7) | non-treated | treated | non-treated | non-treated | non-treated | non-treated | non-treated |
| Contact angle to water (*4) | 66 | | 65 | 62 | 63 | 66 | 65 |
| Film appearance prior to outdoor exposure (*5) | ⊙ | ⊙ | ⊙ | ⊙ | ⊙ | ⊙ | ⊙ |
| Outdoor exposure tests (*6) | | | | | | | |
| one month | | | | | | | |
| gloss retension | 100 | 100 | | | | | |
| color difference | 6.8 | 3.5 | | | | | |
| appearance | ⊙ | ⊙ | | | | | |
| 3 months | | | | | | | |
| gloss retension | 100 | 100 | 100 | 100 | 100 | 100 | 100 |
| color difference | 3.5 | 3.0 | 3.0 | 3.0 | 3.3 | 3.5 | 3.9 |
| appearance | ⊙ | ⊙ | ⊙ | ⊙ | ⊙ | ⊙ | ⊙ |

| | Examples | | | Comparative Examples | | | |
|---|---|---|---|---|---|---|---|
| | 32 | 33 | 34 | 12 | 13 | 14 | 15 |
| Treatment (*7) | non-treated | non-treated | non-treated | non-treated | non-treated | non-treated | non-treated |
| Contact angle to water (*4) | 60 | 63 | 64 | 89 | 90 | 90 | 89 |
| Film appearance prior to outdoor exposure (*5) | ⊙ | ⊙ | ⊙ | ⊙ | ⊙ | ⊙ | ⊙ |
| Outdoor exposure tests (*6) | | | | | | | |
| one month | | | | | | | |
| gloss retension | | | | | | | |
| color difference | | | | | | | |
| appearance | | | | | | | |
| 3 months | | | | | | | |
| gloss retension | 100 | 100 | 100 | 100 | 100 | 100 | 100 |
| color difference | 3.8 | 3.7 | 3.5 | 8.1 | 8.5 | 9.0 | 8.2 |
| appearance | ⊙ | ⊙ | ⊙ | ⊙ | ⊙ | ⊙ | ⊙ |

Powder Coating Composition

Examples 35–43

Components shown in Table 6 were mixed in a Henschel mixer, followed by kneading under the conditions of an extrusion rate of 30 to 70 kg/H, a temperature of 80° to 120° C. and a rotational speed of 100 rpm by use of a BUSSCOKNEADER PR46 (Trade name, marketed by BUSS Co., Ltd., Switzerland) kneader, removing the kneaded mixture in the form of a flat board having a thickness of 3 to 6 mm, immediately cooling, roughly grinding in a size of 2 to 3 mm, pulverizing by use of an atomizer (marketed by Fuji Sangyo Co., Ltd.), sieving by use of a 150 mech standard sieve, and by removing coarse particles to obtain powder coating compositions of Examples 35 to 43 respectively.

Comparative Examples 16–18

Comparative powder coating compositions of Comparative Examples 16–18 were prepared in the same manner as in Example 35 by use of components shown in Table 6 respectively.

In Table 6, details of respective components are as follows. In Table 6, amounts of respective components in the formulation are represented by parts by weight respectively.
Resin:

Acrylic resin A: methyl methacrylate/styrene/n-butyl acrylate/glycidyl methacrylate=37/20/23/20 (weight ratio), weight average molecular weight: 7000, glass transition temperature: about 40° C.

Acrylic resin B: methyl methacrylate/styrene/n-butyl acrylate/hydroxyethyl methacrylate=41/15/24/20 (weight ratio), weight average molecular weight: 5,000, glass transition temperature: about 40 ° C. polyester resin A: URA-LAC P-2400 (Trade name of carboxyl group-containing polyester resin, marketed by DSM RESINS BV Co., Ltd.)
Curring Agent:

(*8) B-1530: Trade name of isophorone diisocyanate blocked with ε-caprolactam, marketed by Daicell Hulls Co., Ltd.

TABLE 6

| | | Examples | | | |
|---|---|---|---|---|---|
| Components and formulation | | 35 | 36 | 37 | 38 |
| Resins | Acrylic resin A | 100 | 100 | 100 | 100 |
| | Acrylic resin B | | | | |
| | polyester resin A | | | | |
| Curing agent | dodecanoic diacid | 20 | 20 | 20 | 20 |
| | B-1530 (*3) | | | | |
| | triglycidyl isocyanurate | | | | |
| Silicon compounds | tetraphenyl silicate | | 20 | | |
| | tetraethyl silicate | 10 | | | |
| | tetraphenylethyl silicate | | | 20 | |
| | methyl silicate 51 (*) | | | | 20 |

TABLE 6-continued ethyl silicate 40 (*)
ethyl silicate 48 (*)

|  | Examples |  |  |  | Comparative Examples |  |  |
|---|---|---|---|---|---|---|---|
| 39 | 40 | 41 | 42 | 43 | 16 | 17 | 18 |
| 100 | 100 | 100 |  |  | 100 |  |  |
|  |  |  | 100 |  |  | 100 |  |
|  |  |  |  | 100 |  |  | 100 |
| 20 | 20 | 20 |  |  | 20 |  |  |
|  |  |  | 20 |  |  | 20 |  |
|  |  |  |  | 7 |  |  | 7 |
|  |  | 40 |  |  |  |  |  |
| 20 |  |  |  |  |  |  |  |
|  | 20 |  | 20 | 20 |  |  |  |

Film Appearance and Film Performance Tests

The powder coating composition of Example 35 was coated onto a zinc phosphate-treated steel plate (08. mm in thickness) to be a cured film thickness of about 60 μm by electrostatic powder coating process, followed by heating at 170° C. for 30 minutes to be evaluated as "non-treated". The above cured film was dipped into a 2.5 wt % aqueous sulfuric acid solution at 20° C. for 24 hours to be treated, followed by washing the aqueous sulfuric acid solution adhered onto the film with water, and by drying at room temperature to be evaluated as "treated".

Separately, cured films were obtained in the same manner as in Example 35 except that powder coating compositions of Examples 36–43 and comparative powder coating compositions of Comparative Examples 16–18 were used, and were evaluated as above.

Comparative Example 19

A cured film was formed in the same maner as in Comparative Example 16 by use of the comparative powder coating composition of Comparative Example 16, followed by coating tetraethyl silicate to be a thickness of about 10 μm onto the surface of the cured film, and drying at 20° C. for 24 hours to be evaluated as above.

Results are shown in Table 7.

Test methods and evaluation criteria of appearance and performances for films obtained are shown by (*2) to (*6) to have the same meanings as above respectively.

TABLE 7

|  | Examples |  |  |  |  |  |  |
|---|---|---|---|---|---|---|---|
|  | 35 |  | 36 | 37 | 38 | 39 | 40 |
| Treatment | non-treated | treated | non-treated | non-treated | non-treated | non-treated | non-treated |
| Adhesion properties (*2) | ○ | ○ | ○ | ○ | ○ | ○ | ○ |
| Fabfricating properties (*3) | 30 | 30 | 30 | 30 | 30 | 30 | 30 |
| Contact angle to water (*4) |  | 64 | 62 | 63 | 62 | 62 | 58 |
| Film appearance prior to outdoor exposure (*5) | ⊚ | ⊚ | ⊚ | ⊚ | ⊚ | ⊚ | ⊚ |
| Outdoor exposure tests (*6) |  |  |  |  |  |  |  |
| one month |  |  |  |  |  |  |  |
| gloss retension | 100 | 100 | — | — | — | — | — |
| color difference | 3.5 | 6.0 | — | — | — | — | — |
| appearance | ⊚ | ⊚ | — | — | — | — | — |
| 3 months |  |  |  |  |  |  |  |
| gloss retension | 100 | 100 | 100 | 100 | 100 | 100 | 100 |
| color difference | 3.3 | 3.5 | 3.3 | 3.2 | 3.4 | 3.1 | 2.2 |
| appearance | ⊚ | ⊚ | ⊚ | ⊚ | ⊚ | ⊚ | ⊚ |
| 6 months |  |  |  |  |  |  |  |
| gloss retension | 98 | 98 | 97 | 97 | 98 | 97 | 98 |
| color difference | 3.4 | 3.3 | 3.1 | 3.1 | 3.3 | 2.9 | 2.1 |
| appearance | ⊚ | ⊚ | ⊚ | ⊚ | ⊚ | ⊚ | ⊚ |

|  | Examples |  |  | Comparative Examples |  |  |  |
|---|---|---|---|---|---|---|---|
|  | 41 | 42 | 43 | 16 | 17 | 18 | 19 |
| Treatment | non-treated | non-treated | non-treated | non-treated | non-treated | non-treated | non-treated |
| Adhesion properties (*2) | ○ | ○ | ○ | ○ | ○ | ○ | — |
| Fabfricating properties (*3) | 40 | 30 | 30 | 30 | 40 | 30 | — |
| Contact angle to water (*4) | 61 | 58 | 59 | 92 | 90 | 89 | ** |
| Film appearance prior to outdoor exposure (*5) | ⊚ | ⊚ | ⊚ | ⊚ | ⊚ | ⊚ | ○ |
| Outdoor exposure tests (*6) |  |  |  |  |  |  |  |
| one month |  |  |  |  |  |  |  |
| gloss retension | — | — | — | — | — | — | — |
| color difference | — | — | — | — | — | — | — |
| appearance | — | — | — | — | — | — | — |

TABLE 7-continued

| 3 months | | | | | | | |
|---|---|---|---|---|---|---|---|
| gloss retension | 100 | 100 | 100 | 100 | 100 | 100 | 100 |
| color difference | 3.2 | 2.0 | 2.0 | 7.0 | 7.0 | 7.8 | 8.2 |
| appearance | ⊚ | ⊚ | ⊚ | ⊚ | ⊚ | ⊚ | ○ |
| 6 months | | | | | | | |
| gloss retension | 99 | 97 | 98 | 98 | 97 | 67 | — |
| color difference | 3.0 | 1.9 | 1.9 | 9.0 | 9.2 | 8.5 | 10 or more |
| appearance | ⊚ | ⊚ | ⊚ | ⊚ | ⊚ | ⊚ | X |

We claim:

1. A film-forming process which comprises (a) coating a topcoating composition onto a substrate to form a film, said topcoating composition having been prepared by incorporating an organosilicate represented by the formula:

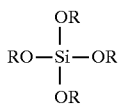

wherein the Rs are the same or different and each R is hydrogen atom or a monovalent hydrocarbon group having 1 to 10 carbon atoms, and/or its condensate, into an organic solvent-based organic coating composition, and (b) treating the surface of said topcoating composition coating on the film with an acid, said treated surface showing a contact angle to water of 70 degrees or less.

2. The film-forming process as claimed in claim 1 wherein the topcoating composition is coated onto the substrate by means of brushing, spray coating, roller coating, dip coating or electrostatic powder coating.

3. The film-forming process as claimed in claim 1 wherein the film of topcoating composition is dried before the acid treatment.

4. The film-forming process as claimed in claim 1 wherein the acid treatment of the film involves treating the surface of the film with an acidic aqueous solution having a pH of 6 or less at about 5° C. to 98° C.

5. The film-forming process as claimed in claim 1 wherein the acid is an inorganic acid.

6. The film-forming process as claimed in claim 5 wherein the inorganic acid is sulfuric acid, hydrochloric acid, nitric acid or phosphoric acid.

7. The process as claimed in claim 1 wherein the organic coating composition contains a reactively curable organic resin as a resin component.

8. The process as claimed in claim 7 wherein the organic coating composition contains a hydroxyl group-containing base resin and an amino resin crosslinking agent as the reactively curable organic resin.

9. The process as claimed in claim 7 wherein the organic coating composition contains a hydroxyl group-containing base resin and a polyisocyanate compound crosslinking agent as the reactively curable organic resin.

10. The process as claimed in claim 7 wherein the organic coating composition contains, as the reactively curable organic resin, a resin or resin mixture containing silanol groups and/or hydrolyzable silyl groups, hydroxyl groups and epoxy groups as functional group components, and a curing catalyst.

11. The process as claimed in claim 10 wherein the organic coating composition is a copolymer obtained by radically copolymerizing at least one silanol group and/or hydrolyzable silyl group-containing polymerizable unsaturated monomer selected from a silane monomer having at least one silanol group and/or hydrolyzable silyl group and at least one polymerizable unsaturated group, and a polysiloxane macromonomer having at least one silanol group and/or at least one hydrolyzable silyl group and at least one polymerizable unsaturated group; a hydroxyl group-containing polymerizable unsaturated monomer, an epoxy group-containing polymerizable unsaturated monomer, and, optionally another polymerizable unsaturated monomer.

12. The process as claimed in claim 10 wherein the curing catalyst is a metal chelate compound.

13. The process as claimed in claim 9 wherein the hydroxy group-containing organic base resin is an acrylic and/or fluorocarbon polymer.

14. The process as claimed in claim 7 wherein the reactively curable organic resin is an acrylic and/or fluorocarbon polymer.

15. The process as claimed in claim 1 wherein each R in the formula of the organosilicate is a lower alkyl group having 1 to 3 carbon atoms.

16. The process as claims in claim 1 wherein the condensate has a degree of condensation of 2 to 10.

17. The process as claimed in claim 1 wherein the organosilicate in topcoating composition is present in an amount in the range of 0.1 to 50 parts by weight per 100 parts by weight of the resin solid content in the organic coating composition.

18. The process as claimed in claim 1 wherein the contact angle is in the range of 20 to 65 degrees.

19. The process as claimed in claim 1 wherein the organic solvent is a member selected from the group consisting of an aromatic hydrocarbon solvent, a ketone solvent, an ester solvent, an ether solvent, an alcohol solvent and an aliphatic hydrocarbon.

20. The process as claimed in claim 1 wherein the organic solvent is selected from the group consisting of toluene, xylene, methyl ethyl ketone, methyl isobutyl ketone, ethyl acetate, butyl acetate, dioxane, ethylenegylcol diethyl ether, butanol, propanol, pentane, hexane and heptane.

21. The process as claimed in claim 1 wherein the organic solvent is an organic solvent which is inactive with the curable resin composition and is capable of dissolving or dispersing the curable resin composition.

22. The process as claimed in claim 1 wherein the organic solvent is present in an amount of about 10 to 95 percent by weight, based on the total weight of the organic solvent and the curable resin composition.

23. The process as claimed in claim 1 wherein the organic solvent-based organic coating composition includes a non-crosslinkable coating composition.

24. The process as claimed in claim 23 wherein the organic solvent which evaporates at room temperature or upon being subjected to heat.

25. A film-forming process which comprises (a) coating the process topcoating composition onto a substrate to form a film, said topcoating composition having been prepared by incorporating condensate of an organosilicate represented by the formula:

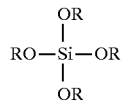

wherein the Rs are the same or different and each R is hydrogen atom or a monovalent hydrocarbon group having 1 to 10 carbon atoms, into an organic solvent-based organic coating composition, the condensate having a degree of condensation of 2 to 10, and an amount of the organosilicate in topcoating composition is in the range of 0.1 to 50 parts by weight per 100 parts by weight of the resin solid content in the organic coating composition, and (b) treating the surface of said topcoating composition coating on the film with an acid, said surface showing a contact angle to water in the range of 20 to 65 degrees.

* * * * *